United States Patent [19]

Wu

[11] Patent Number: 5,260,818
[45] Date of Patent: Nov. 9, 1993

[54] DISPLAY PANEL PROVIDED WITH REPAIR CAPABILITY OF DEFECTIVE ELEMENTS

[75] Inventor: Biing-Seng Wu, Nan-Yia Street, Taiwan

[73] Assignee: Industrial Technology Research Institute, Hsinchu, Taiwan

[21] Appl. No.: 881,076

[22] Filed: May 11, 1992

[51] Int. Cl.⁵ .............................................. G02F 1/1343
[52] U.S. Cl. ........................................ 359/59; 359/87
[58] Field of Search .................................. 359/59, 87

[56] References Cited

U.S. PATENT DOCUMENTS

| | | | |
|---|---|---|---|
| 4,840,459 | 6/1989 | Strong | 359/87 |
| 5,062,690 | 5/1991 | Whetton | 359/59 |
| 5,076,666 | 12/1991 | Yatayama et al. | 359/87 |
| 5,132,819 | 7/1992 | Noriyama et al. | 359/59 |
| 5,164,851 | 11/1992 | Kanemoui et al. | 359/59 |

Primary Examiner—William L. Sikes
Assistant Examiner—Ron Trice
Attorney, Agent, or Firm—George D. Saile

[57] ABSTRACT

A liquid crystal display panel with a repair capability that has a plurality of optical display cells arranged in a matrix format with scan lines and orthogonal data lines, at least two field effect transistors associated with each cell adapted to each operate in parallel one half of a split plate electrode. A means is provided to segregate one of the transistors when it is defective. Also, is provided a means to electrically join the parts of the plate electrode. The method involves providing the above described display panel, testing the panel and noting the existence of any defective transistors, segregating the defective transistor, and joining the parts of the split plate electrode of the cells associated with a defective transistor.

15 Claims, 6 Drawing Sheets

DISPLAY PANEL PROVIDED WITH REPAIR CAPABILITY OF DEFECTIVE ELEMENTS

BACKGROUND OF THE INVENTION (1) Field of the Invention

This invention relates to repairable display panels, and methods of repairing the panels, and more particularly to a display panel having redundant control elements and methods of repairing the panel wherein the defective elements are neutralized and isolated.

(2) Description of the Prior Art

Modern flat panel liquid crystal displays (LCD) have found wide usage, particularly in small portable computers capable of operating on batteries. Such displays, in general have a layer of liquid crystal material that is capable of changing its optical characteristics when exposed to an electric field. The LC material is usually sandwiched between two transparent or semitransparent glass substrates. One of the glass substrates has a matrix consisting of a set of spaced parallel conductive scan lines, and a second set of orthogonal spaced parallel conductive data lines. The areas defined by the lines define pixel areas. Each pixel contains a switching element, a transparent pixel electrode, and a storage capacitor. An array of switching elements, usually thin film transistors are associated with the scan and data lines, and operate to selectively apply electrical potentials to the pixel electrodes. The applied potential influences the liquid crystal material in the immediate area.

Figure 1:
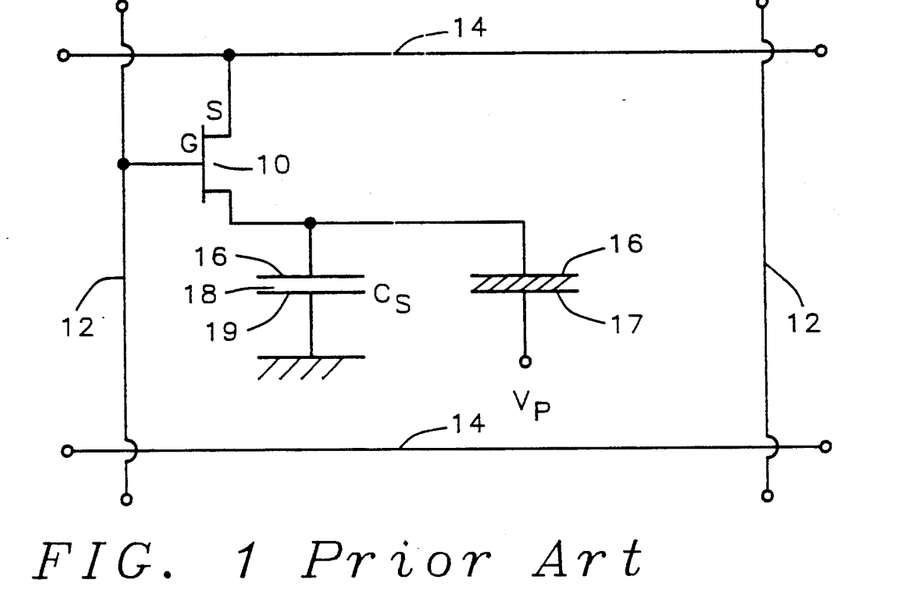
FIG. 1 is a schematic circuit diagram of a single pixel of a typical Prior Art LC display panel.

The potential is applied across a common conductive electrode on the opposed panel. FIG. 1 depicts a schematic diagram of a single pixel of a thin film transistor liquid crystal display panel. A field effect transistor 10, normally a very small thin film transistor (TFT) having an amorphous or polycrystalline silicon layer with a gate connected to a scan line 12, and the source joined to a data line 14. The drain is connected to pixel electrode 16. The area beneath pixel electrode 16 designates liquid crystal (LC) material. Numeral 17 indicates the common electrode on the opposed substrate panel above the pixel electrode 16. The area of pixel electrode 16 is equal to the area of the liquid crystal capacitor, and the dielectric of the liquid crystal capacitor is the liquid crystal itself. Numeral 18 designates a storage capacitor consisting part of pixel electrode 16, and a lower electrode plate 19 positioned below electrode plate 16, and separated by a dielectric. The gate insulating layer of the thin film transistor 10 can be used as the dielectric layer of the storage capacitor. In operation, the transistor 10 in response to signals on the scan and data lines, is selectively turned on to influence the liquid crystal material between plates 16 and 17 to produce an transmissible or opaque area which is dependent on the applied voltage of the pixel electrode.

Storage capacitors are usually used to improve the image quality of the TFT LCD. The storage capacitor 18 is usually electrically connected in parallel to the liquid crystal capacitor. It is necessary to improve the display performance for the following reasons: (1) it can reduce the cross talk between the pixel electrode 16 and the adjacent data line, (2) it can reduce the unacceptable voltage jump which occurs when the TFT is switched off, (3) it can increase the RC time constant that increases the gray level capability of the TFT LCD. However, the area of the storage capacitor is much larger than that of the transistor region, thus failure probability of the storage capacitor is much higher than that of the transistor. The panel is normally back lighted. An image is thus formed on the display panel, using many adjacent associated pixels, in response to signals applied to the scan and data lines.

During manufacture of liquid crystal display panels, defects in various lines, transistors and the storage capacitors, etc. can occur which will produce nonfunctioning individual pixels. The point defects will occur in the TFT LCD. The first is the TFT cannot charge the capacitors in the turn on period. We call this kind of failure the on-failure. The second is that the capacitors (which includes the liquid crystal capacitor and the storage capacitor) cannot keep the potential during the frame time. We call this kind of failure, the off-failure.

The frame time is defined as the period of a scan line signal. The on-failure is induced from the failure of TFT. The off-failure is induced from the leakage of TFT or the leakage of the storage capacitor. These nonfunctioning pixels can either be ignored, resulting in a poor quality panel or the defective panel discarded. Since display panels are relatively expensive, these are not desirable alternatives.

The U.S. Pat. No. 4,840,459 discloses a display panel with auxiliary repair lines that cross over the main scan and data lines of the display. The auxiliary lines can be electrically shorted to repair open circuit elements of the display panel. That is, this patent can repair the line defected to a point defect, however, it cannot be used to repair the point defect alone.

SUMMARY OF THE INVENTION

An object of the invention is to provide a new display panel structure with a point defect repair capability.

Another object of the invention is to provide a process for repairing display panels having individual transistor and/or storage capacitor defects.

In accordance with the above objects there is provided a display panel with a repair capability having a plurality of display pixels arranged in a matrix format, scan lines and data lines, at least two field effect transistors associated with each pixel with lines connections between the gate electrodes of the transistors and a scan line, severable line connections between the source electrodes of the transistor and the data line, a split pixel electrode, severable line connections between the drain electrodes of the transistors and the respective parts of the plate electrode, and a means to weld the parts of the split plate electrode.

That is, each pixel is divided into two (or more) sub-pixels, each sub-pixel contains a transistor, a pixel electrode, and a storage capacitor. Between each source electrode of the sub-pixel and the data line, there is a severable line connection. Between each drain electrode and pixel electrode of one sub-pixel, there is a severable line connection. A conductive connection is located between each of the sub-pixels. Each drain electrode of the transistors of the sub-pixels have an overlap region with the conductive electrode. An insulating layer is formed between the drain electrode and the conductive layer. The drain electrode of a TFT is connected to the conductive electrode, and the other TFT has no interconnection with the conductive electrode. Between two parallel scan lines, the first electrode of the storage capacitor is formed as a strip simultaneously and parallel with the scan lines. Both ends of all the first electrodes are connected to common electrodes. The two common electrodes are contacted to the common electrode on the top glass by the conductive glue.

The method of the invention involves providing the above described thin film transistor liquid crystal display panel, powering up the panel and noting the defective sub-pixels, cutting the severable lines between the scan line and the defective transistor, and between the pixel electrode and the defective transistor, and cutting two sides of the storage capacitor (where storage capacitors are used), and welding the parts of the split plate electrode. The cutting and welding processes are preferably performed by a laser.

DESCRIPTION OF THE PREFERRED EMBODIMENTS

Figure 2A:
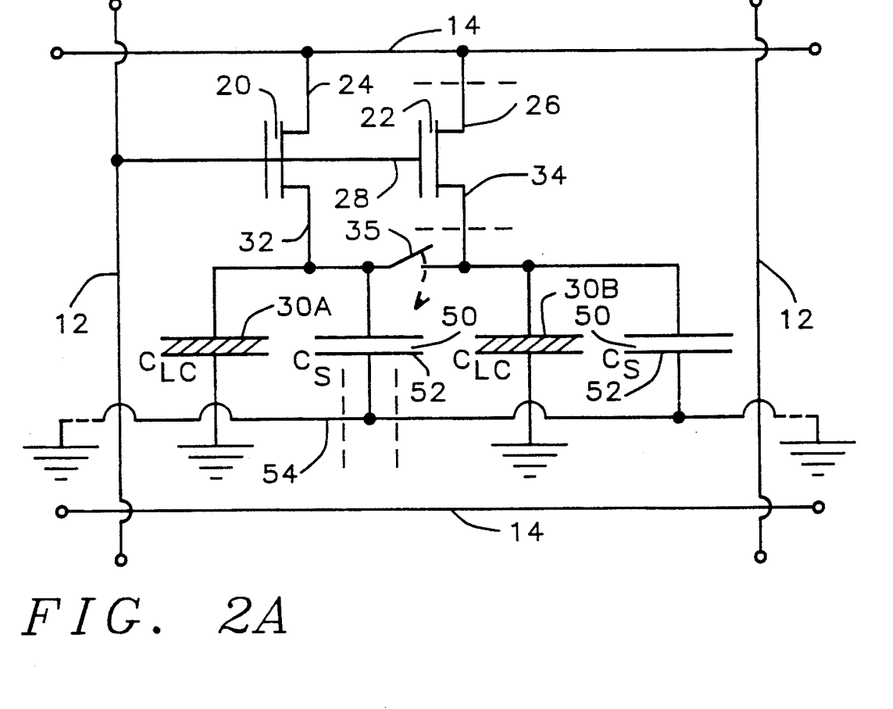
FIGS. 2A and B are circuit diagrams embodiments of a single pixel of a LC display panel constructed in accordance with the teachings of the invention.

Referring now to the FIGS. of the drawings, and in particular to FIG. 2A, there is illustrated a schematic circuit diagram which illustrates the basic concepts of the present invention. Conductive lines 12 and 14 constitute a portion of a line matrix supported on a substrate. In this explanation, lines 12 will be described as scan lines, and lines 14 will be described as the data lines. The area enclosed between two adjacent scan lines and two adjacent data lines 14 defines a single pixel, which will control a single pixel in the display panel. Each pixel in the matrix array on the display panel can be individually addressed and controlled by appropriate electric pulses applied simultaneously to the scan and data lines, as is known in the art.

As indicated in FIG. 2A, each pixel consists of two (or more) sub-pixels. Each sub-pixel has a field effect transistor, normally thin film transistor. The transistors 20 and 22, each have a gate electrode, a source electrode and a drain electrode. The gate electrodes are connected to scan line 12. The source electrodes are connected to data lines 14 by severable lines 24 and 26. The drain electrode of each transistor, 20 or 22, in each sub-pixel is connected to the respective transparent pixel electrode 30B. Storage capacitor 50 is provided with a capacitor plate 52 positioned beneath pixel electrode 30 and a dielectric layer (not shown) sandwiched between pixel electrode 30 and the capacitor plate 52.

Figure 3:
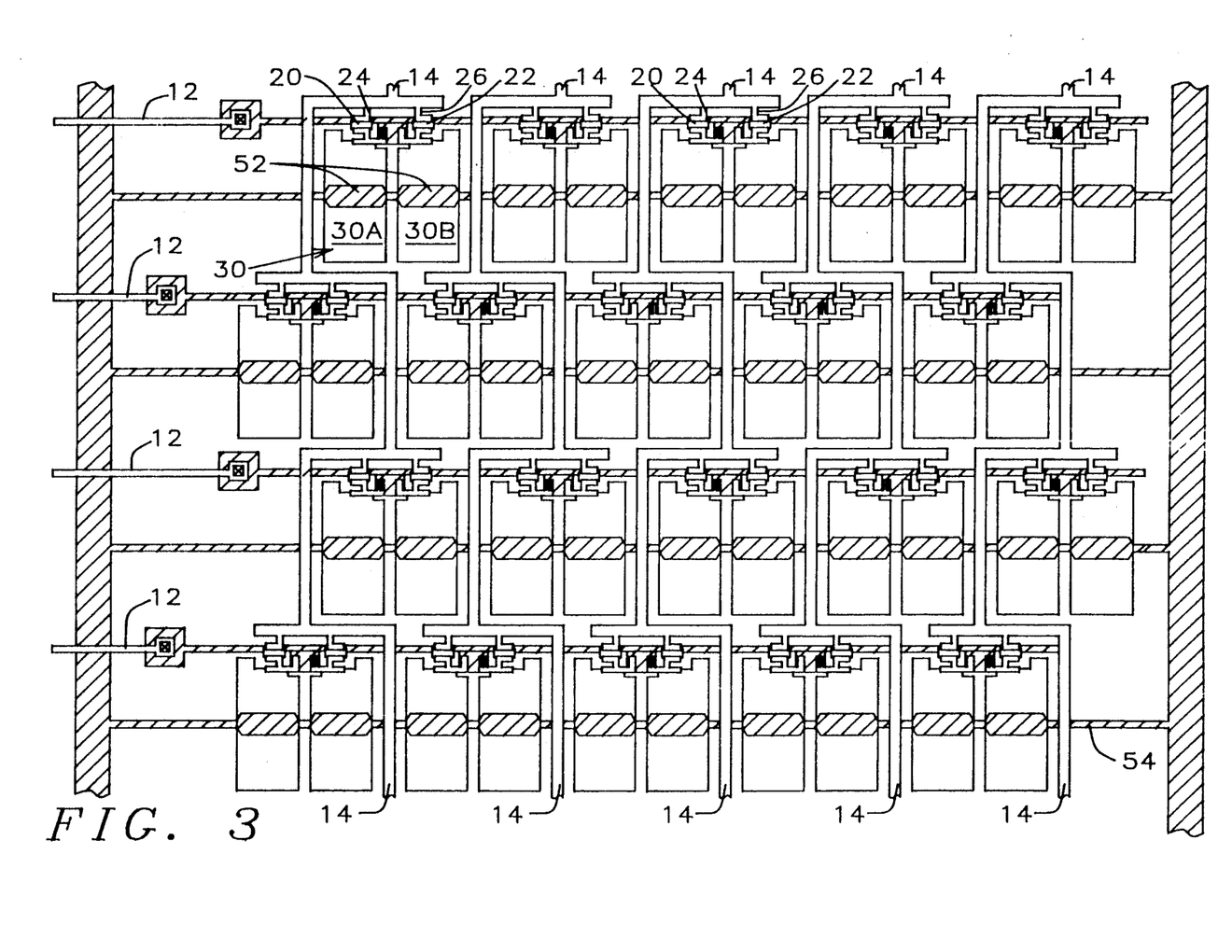
FIG. 3 is a top plan view in greatly enlarged scale of a portion of an array of pixels of the display panel of the invention.
Figure 4A:
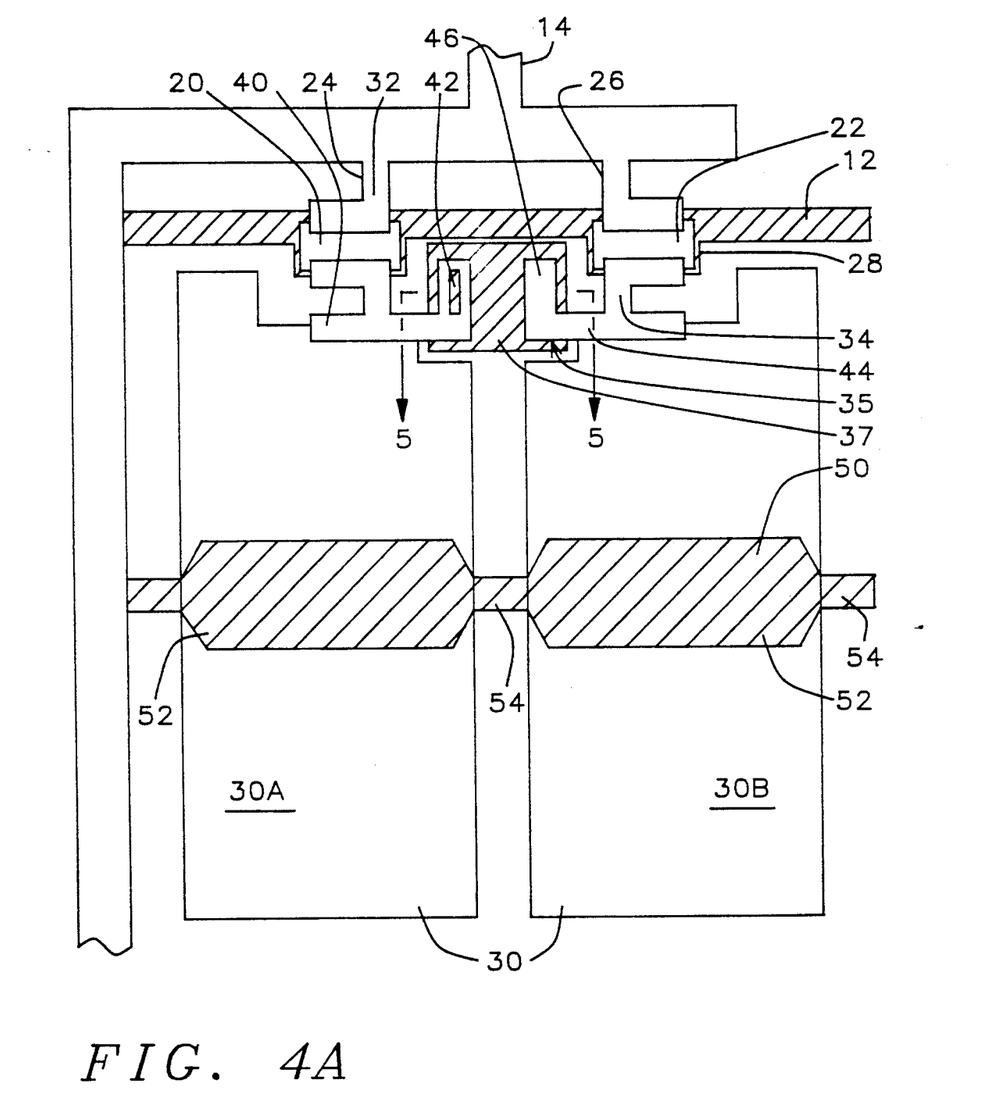
FIGS. 4A and B are embodiments with top plan view of a single pixel, in even greater enlarged scale of the array shown in FIG. 3.

A preferred matrix embodiment for the display panel is illustrated in more detail in FIG. 3, and a single pixel is shown in FIG. 4A. As most clearly shown in FIG. 4 extensions 28 to scan line 12 constitutes the gate electrodes for transistors 20 and 22. Severable lines 24 and 26 connect the source electrodes of transistors 20 and 22. to data line 14, respectively. The pixel has a split pixel electrode 30, formed of electrically conductive transparent material such as indium tin oxide (ITO). The electrode parts 30A and 30B are connected to the drain electrodes of transistors 20 and 22 by severable lines 32 and 34. A dielectric layer 39 is provided over the layer 37. A metal strip 40, is joined to the layer 37 through the contact window 42 of the dielectric layer 39. One terminal of a second metal strip 44 is connected to pixel electrode 30B, and above dielectric layer 39, the other terminal of the second metal strip 44 extends above parts of the conductive layer 37. The overlap region of the second metal strip 44 with conductive layer 37 is defined as pad 46.

A storage capacitor 50 provided to store the potential applied to pixel electrode 30, reduces the cross talk between data line 14 and pixel electrode 30, and reduces the cross talk between scan line 12 and the pixel electrode, which can induce the unacceptable DC bias to the LC capacitor. Storage capacitor 50 is provided with a dielectric layer (not shown) sandwiched between pixel electrode 30 and capacitor plate 52. As shown most clearly in FIG. 4A, each plate 52 is connected to the adjacent sub-pixel by a severable line 54, exposed between electrode plates 30A and 30B. Both ends of the connected capacitor plates 52, which are connected by the severable lines 54, are connected to a common electrode. The two common electrodes are contacted to the common electrode on the top glass by the conductive glue. After fabrication of active matrix array, the standard twisted nematic liquid crystal process is applied to make the display panel, and the panel is ready to be tested.

The method of repairing a display panel involves providing the above described display panel with redundant transistors and redundant storage capacitors. The display panel is tested to determine if there are any defective sub-pixels. This is done by turning on the display and finding the defective sub-pixels in the display panel. That is, in the normally black mode applying signals to the scan lines one by one and applying the turn-on voltage of the liquid crystal to all the data lines to turn on all the sub-pixels. In this bias condition all the sub-pixels should be optically transmissible except for the failed sub-pixels. The defective sub-pixels occur due to the failure of transistors and/or storage capacitors, for example if the two plates 30B and 52 of the storage capacitor are shorted due to pin holes in the dielectric layer, and/or the source electrode of the transistor 20 is opened, then the respondent sub-pixel will have failed.

After the defective sub-pixels are determined, the transistors and the storage capacitors to be deleted are also determined. For example, if the sub-pixel controlled by the transistor 22 failed, then the transistor 22 is segregated by severing lines 26 and 34, and the storage capacitor plate 52 is isolated from the common electrode by severing lines 54 which are adjacent to the capacitor plate 52 and the switch 35 which is closed by fusing the dielectric layer 39, as illustrated in FIG. 2A.

The severing operations are achieved by the use of a laser to melt the metal films. The severable lines 26 and 34 of the transistor 22 is formed of a metal film, preferred produced simultaneously with the capacitor plate 52. The switch 35 is closed by fusing the pad 46 to the lower conduction layer 37 through dielectric layer 38. An electrical connection can be made between pixel electrodes 30A and 30B by melting a hole through dielectric layer 38 in the pad 46 and fusing the melt of the pad 46 with the metal in conductive layer 37.

Figure 5A:
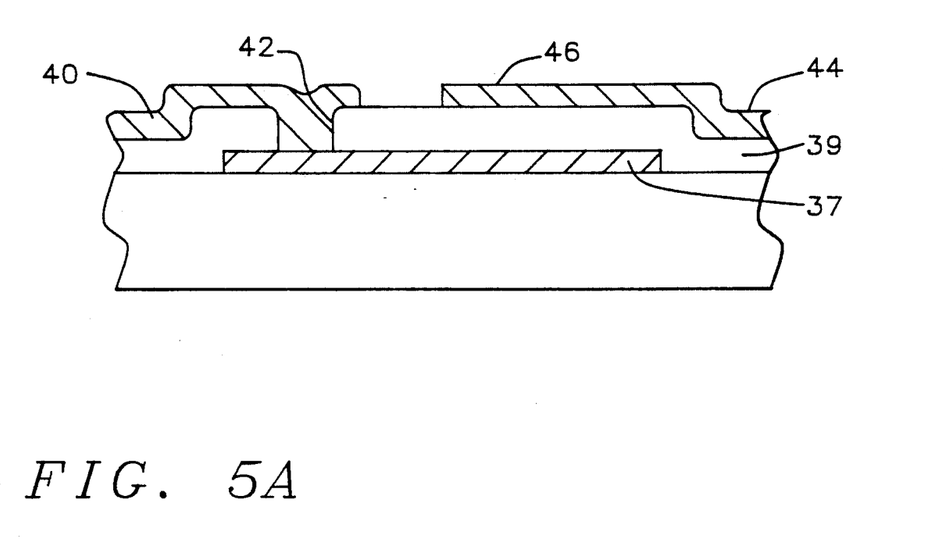
FIG. 5A is a sectional view in broken section of a cross-section taken on the line 5—5 of FIG. 4.
Figure 5B:
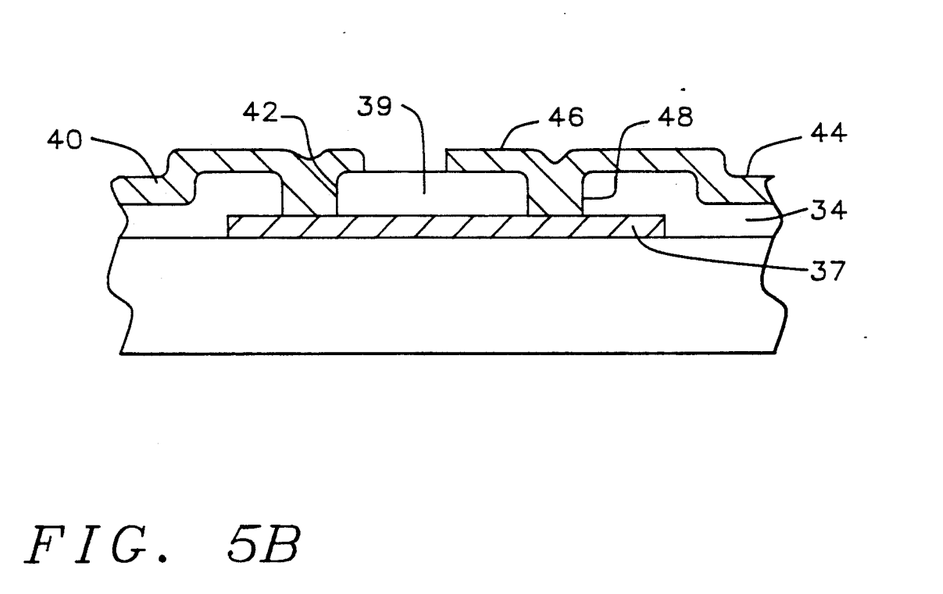
FIG. 5B is a sectional view similar to FIG. 5A except that the lines have been fused to make an electrical connection.

The details of this arrangement are more clearly illustrated in FIGS. 5A and 5B. In FIG. 5A there is no electrical connection between the plate electrode parts 30A and 30B. However, in FIG. 5B an electrical connection 48 is shown between pad 46 and conductive layer 37, thereby establishing an electrical connection between electrode plates 30A and 30B. An electrical connection 42 is shown between pad 40 and conductive layer 37. Whether the metal film is opened or fused to the lower conduction layer can be controlled by adjusting the laser power. The capacitor electrode 52 beneath the plate electrode 30B is also segregated by severing lines 54 with a laser beam.

This is necessary because the capacitance necessary to properly operate each transistor is provided by a single plate 52. When only one transistor remains, and the split plates are joined, the capacitance provided by the double the area of capacitor plate may exceed the amount required for proper operation.

After the repairs are made to the panel, a layer of LC material is applied and the top substrate (not shown), provided with conductive plate is applied and the edges sealed.

Figure 2B:
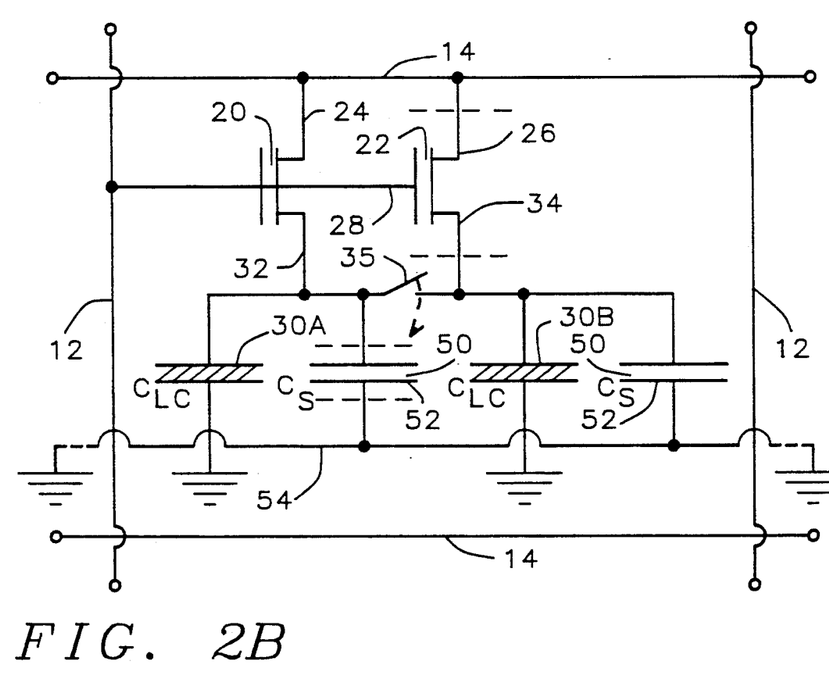
Figure 4B:
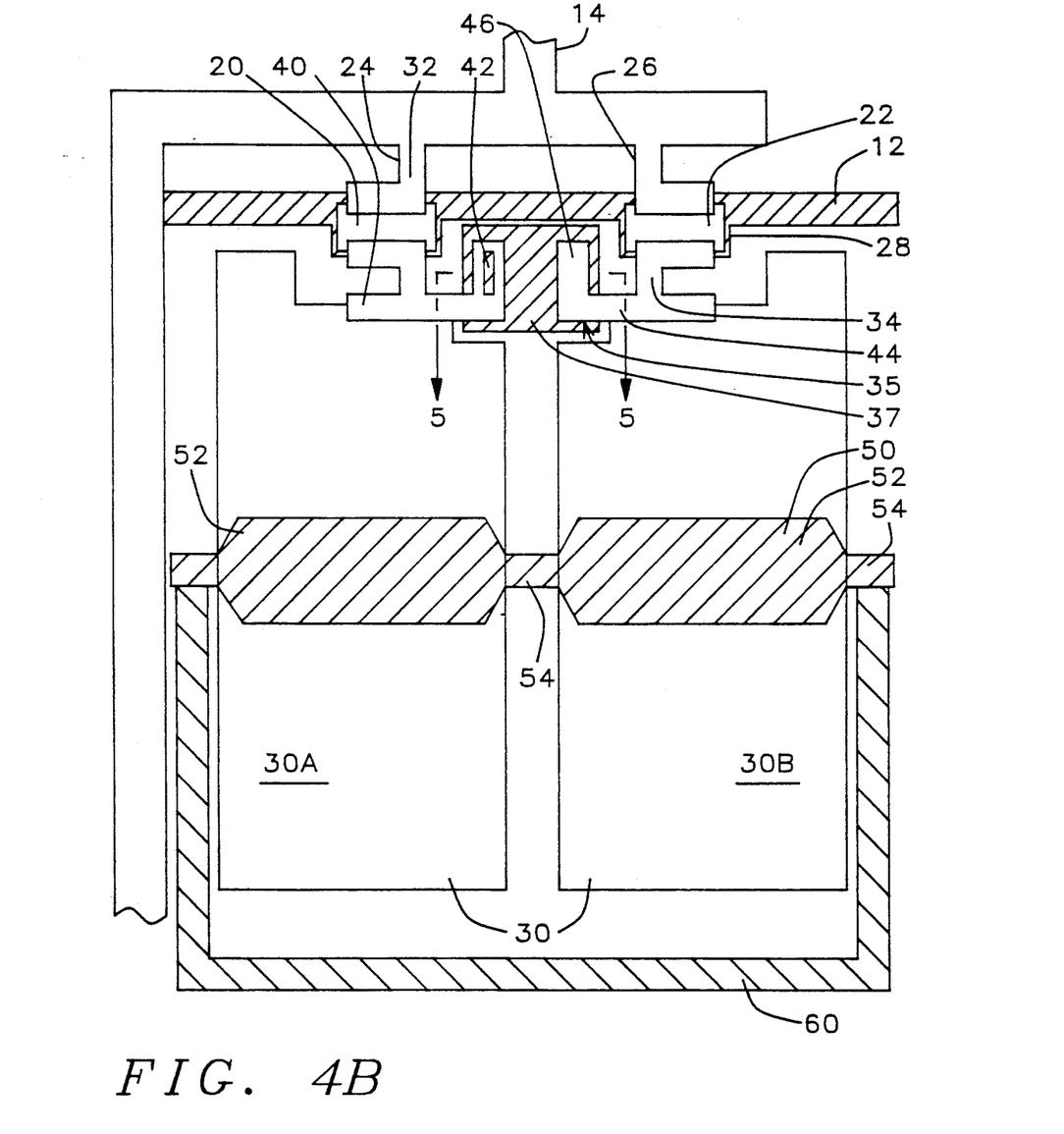

A second embodiment is shown in FIG. 2B and FIG. 4B. This embodiment has the advantage of being able to repair more than one sub-pixel defects on one scan line. The embodiment of FIG. 2A and FIG. 4A can repair only one sub-pixel on one scan line. Referring now more particularly to FIGS. 2B and 4B, an additional line 60 which parallels the gate line and does not overlap the pixel electrode 30 extends between each plate 52 of a pixel. There is a severable line 54. On the other end of each plate of a pixel there is the severable line 56 (inverted "L" type). One end of the severable line 56 is connected to the additional electrode 60. Electrode 60 is connected to the common electrode at the two ends of the panel shown in the FIGS. 2B and 4B.

Where there are more than one sub-pixel defect on a scan line, the defects can be repaired by cutting one pair of severable lines 54 and 56 of a sub-pixel or cutting more than one pair of severable lines 54 and 56 of sub-pixels.

While the invention has been particularly shown and described with reference to the preferred embodiments thereof, it will be understood by those skilled in the art that various changes in form and details may be made without departing from the spirit and scope of the invention.

What is claimed is:

1. A liquid crystal display panel having a repair capability comprising:
   a plurality of optical display pixels arranged in a matrix format on a substrate;
   a plurality of parallel scan lines, and a plurality of parallel data lines arranged orthogonally on said substrate, the site of one intersecting scan line and one data line defining a single display pixel;
   at least two thin film field effect transistors associated with each of said display pixels, each transistor having source, drain and gate electrodes;
   first line connections between the gate electrodes of each of said transistors and said scan line of the pixel;
   first severable line connections between the source electrodes of each of said transistors and said data line of a pixel;
   a split plate electrode on said substrate having two separate parts;
   second severable line connections between the drain electrodes of each of said transistors and a respective part of said split plate electrode;
   a means to selectively electrically join the parts of said split plate electrode;
   a conductive metal layer on said substrate adjacent to but spaced from said split plate electrode and said transistors;
   a dielectric layer overlying said metal layer;
   a first metal strip extension to a first of said second severable lines having a portion over said dielectric layer in overlying relation to said metal layer;
   a second metal strip extension to the second of said second severable lines having a portion over said dielectric layer in overlying relation to said metal layer; and
   an electrical connection between said second metal strip extension and said metal layer.

2. The display panel of claim 1 which further comprises: capacitor plates beneath said parts of said split plate electrode; severable electrical connections between said capacitor plates; and a dielectric layer between said split plate electrode and said capacitor plates.

3. The display panel of claim 2 wherein said severable electrical connection between said capacitor plates is a thin metal line that is exposed between said split plate electrodes parts.

4. The display panel of claim 1 wherein said second metal strip extension includes a pad over said dielectric layer, and a contact metal via through said dielectric layer that establishes on electrical contact between said pad of said second metal strip extension and said conductive layer.

5. The display panel of claim 4 wherein said first metal strip extension includes a pad over said dielectric layer.

6. The display panel of claim 5 wherein said dielectric layer is a layer of silicon oxide.

7. The display panel of claim 5 wherein said dielectric layer is a layer of silicon nitride.

8. The display panel of claim 1 wherein said conductive layer is fabricated by the same mask layer of gate electrode of said transistor.

9. The display panel of claim 8 wherein said first and said second metal strip extensions are aluminum.

10. The display panel of claim 2 which further comprises:
    an overlying layer of liquid crystal material over said optical display pixels; and
    an overlaying transparent substrate with a transparent electrode on the layer surface thereof in contact with said liquid crystal material.

11. A method of repairing a display panel having defective elements comprising:
    providing a display panel with a plurality of display pixels having at least two sub-pixels arranged in a matrix on a substrate, including a plurality of scan lines, a plurality of orthogonal data lines, at least two field effect transistors associated with each display pixel with line connections joining the gate electrodes to a scan line, severable lines between the source electrodes and the data line, severable lines between the source electrodes and the data line, a split plate electrode, severable line connections between the drain electrodes of each transistor and the respective parts of the split plate electrode, and a means to electrically join the parts of the split plate electrode, a set of capacitor plates beneath the split plate electrode, a dielectric layer between the capacitor plates and split plate electrode, and severable lines joining the capacitor plates; the capacitor plates underlying the parts of the split plate electrode being electrically connected by thin conductive lines that do not underlie the split plate electrode;

electrically testing the elements of the display panel;

noting the location of defective transistors; and cutting with a laser beam the severable lines between the data line and each defective transistor, the thin conductive lines associated with each defective transistor; and the severable lines between the split plate electrode and each defective transistor, and electrically joining the parts of the split plate electrode associated with the defective transistor.

12. The method of claim 11 wherein the means to electrically join the parts of the split plate electrode is a conductive plate connected to a part of the split plate electrode, a dielectric layer over the conductive plate, a metal strip connected to the other part of the split plate electrode that overlies the dielectric layer, and wherein the step of electrically joining the parts of the split electrode is achieved by forming the opening in the dielectric layer and joining the metal strip to the conduction plate through the opening in said dielectric layer.

13. The method of claim 12 wherein the metal strip includes a pad overlying the dielectric layer, and the electrical connection to the underlying conductive plate is made in the pad area.

14. The method of claim 13 wherein the electrical connection between the pad and the conductive plate is made with a laser beam that melts a hole through the dielectric layer and fuses the pad to the conduction plate.

15. A display panel with a repair capability comprising:

a plurality of optical display pixels arranged in a matrix format with scan lines and orthogonal data lines, and a pair of field effect transistors associated with each display pixel;

a split plate electrode for each pixel;

said pair of transistors operatively associated with said scan lines and said data lines of the pixel in parallel to each operate one half of said split plate electrode;

a means to permit segregating one of said transistors from said scan line and the associated plate electrode;

a means to electrically connect the parts of said split plate electrode;

a capacitor plate beneath each of the parts of said split plate electrode;

severable lines parallel to and spaced from said scan lines, said severable lines joining said capacitor plates; and thin conductive lines connected to said severable lines that are spaced from said split plate electrode and which lie outside the periphery of said plate electrodes.

* * * * *